United States Patent
Connolly

(10) Patent No.: US 6,371,257 B1
(45) Date of Patent: Apr. 16, 2002

(54) PISTON ASSEMBLY FOR USE IN A WHEEL CYLINDER OF A DRUM BRAKE ASSEMBLY

(75) Inventor: Frank Connolly, West Bloomfield, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/434,074

(22) Filed: Nov. 5, 1999

(51) Int. Cl.$^7$ .................... F16D 55/18; F16D 65/78
(52) U.S. Cl. .................. 188/72.4; 188/264 G; 92/248
(58) Field of Search .................. 188/72.4, 326, 188/74, 78, 106 A, 264 G; 92/248, 224, 212

(56) References Cited

U.S. PATENT DOCUMENTS

| | | | | |
|---|---|---|---|---|
| 2,123,379 A | * | 7/1938 | Pfeiffer | 188/152 |
| 3,592,303 A | * | 7/1971 | Tincher | 188/264 G |
| 4,306,489 A | * | 12/1981 | Driver et al. | 92/212 |
| 4,401,012 A | * | 8/1983 | Emmett | 92/248 |
| 4,604,945 A | * | 8/1986 | Mizuhara | 92/176 |
| 4,649,806 A | * | 3/1987 | Hartsock | 92/212 |
| 4,679,493 A | * | 7/1987 | Munro et al. | 92/212 |
| 4,742,897 A | * | 5/1988 | Hiroshi et al. | 188/196 D |
| 5,499,572 A | * | 3/1996 | Cobble | 92/212 |
| 5,575,358 A | * | 11/1996 | McCormick | 188/71.6 |
| 5,713,435 A | * | 2/1998 | Schneider et al. | 188/71.6 |
| 5,845,747 A | * | 12/1998 | Rike et al. | 188/72.4 |

* cited by examiner

Primary Examiner—Christopher P. Schwartz
Assistant Examiner—Melody M. Burch
(74) Attorney, Agent, or Firm—MacMillan, Sobanski & Todd, LLC

(57) ABSTRACT

This invention relates to an improved structure for a piston assembly adapted for use in a wheel cylinder of a drum brake assembly, the drum brake assembly having a pair of brake shoes which are adapted to be urged into frictional engagement with a brake drum. The piston assembly includes a piston body formed from a first material, and a piston cover formed from a second material and integrally molded in situ with the piston body. The piston cover includes an end wall defining an abutment surface which is adapted to engage an upper end of the brake shoe during brake actuation. The piston cover further includes a plurality of circumferentially spaced projections extending from the end wall of the piston cover into the piston body and integrally molded and embedded within the piston body. Each of the projections of the piston cover defines first and second side edges which are in contact with the piston body to thereby assist in securing the piston cover to the piston body.

6 Claims, 3 Drawing Sheets

PISTON ASSEMBLY FOR USE IN A WHEEL CYLINDER OF A DRUM BRAKE ASSEMBLY

BACKGROUND OF THE INVENTION

This invention relates in general to vehicle drum brake assemblies and in particular to an improved structure for a piston assembly adapted for use in a wheel cylinder of such a vehicle drum brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies can be actuated by hydraulic, pneumatic, or mechanical pressure generated by an operator of the vehicle depressing a foot pedal, pulling a hand lever, and the like. The structure and operation of both drum brake assemblies and disc brake assemblies, as well as the actuators therefor, are well known in the art.

A typical drum brake assembly includes a backing plate which is secured to a fixed, non-rotatable component of the vehicle, such as the vehicle axle housing. A pair of opposed arcuate brake shoes are supported on the backing plate for selective movement relative thereto. Each of the brake shoes has a friction pad secured thereto. The drum brake assembly further includes a cylindrical brake drum which is secured to the vehicle wheel for rotation therewith. The interior of the brake drum is hollow, defining an inner cylindrical braking surface. The brake drum is disposed adjacent to the backing plate such that the brake shoes extend within the inner cylindrical braking surface. To effect braking action, the brake shoes are moved outwardly apart from one another such that the friction pads frictionally engage the inner cylindrical braking surface of the brake drum. Such frictional engagement causes slowing or stopping of the rotational movement of the brake drum and, therefore, the wheel of the vehicle in a controlled manner.

One or more actuating mechanisms are provided in the drum brake assembly for selectively moving the brake shoes outwardly apart from one another into frictional engagement with the cylindrical braking surface of the brake drum. Usually, a hydraulically or pneumatically actuated service brake mechanism is provided for selectively actuating the drum brake assembly under normal operating conditions. Such a service brake mechanism can include a hydraulically actuated wheel cylinder having a pair of opposed pistons which abut and move the brake shoes apart from one another into frictional engagement with the cylindrical braking surface of the brake drum.

A mechanically actuated parking and emergency brake mechanism is also usually provided for selectively actuating the drum brake assembly. The parking and service brake mechanism can include an actuating lever pivotally supported on one of the brake shoes. The actuating lever is connected to a cable which, when pulled, moves the brake shoes apart from one another into frictional engagement with the cylindrical braking surface of the brake drum.

SUMMARY OF THE INVENTION

This invention relates to an improved structure for a piston assembly adapted for use in a wheel cylinder of a drum brake assembly, the drum brake assembly having a pair of brake shoes which are adapted to be urged into frictional engagement with a brake drum. The piston assembly includes a piston body formed from a first material, and a piston cover formed from a second material and integrally molded in situ with the piston body. The piston cover includes an end wall defining an abutment surface which is adapted to engage an upper end of the brake shoe during brake actuation. The piston cover further includes a plurality of circumferentially spaced projections extending from the end wall of the piston cover into the piston body and integrally molded and embedded within the piston body. Each of the projections of the piston cover defines first and second side edges which are in contact with the piston body to thereby assist in securing the piston cover to the piston body.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
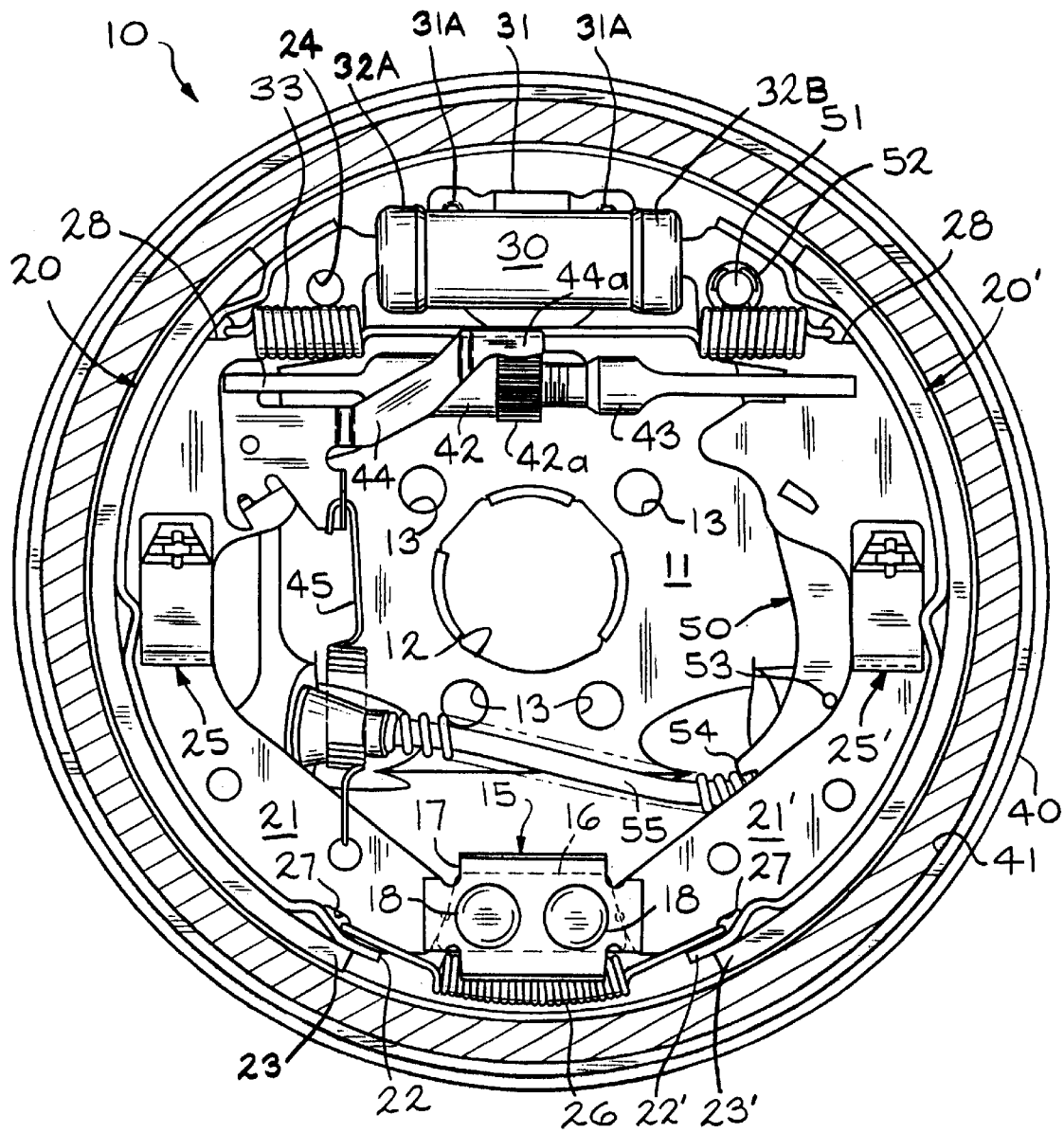
FIG. 1 is a side elevational view of a portion of a prior art drum brake assembly.
Figure 2:
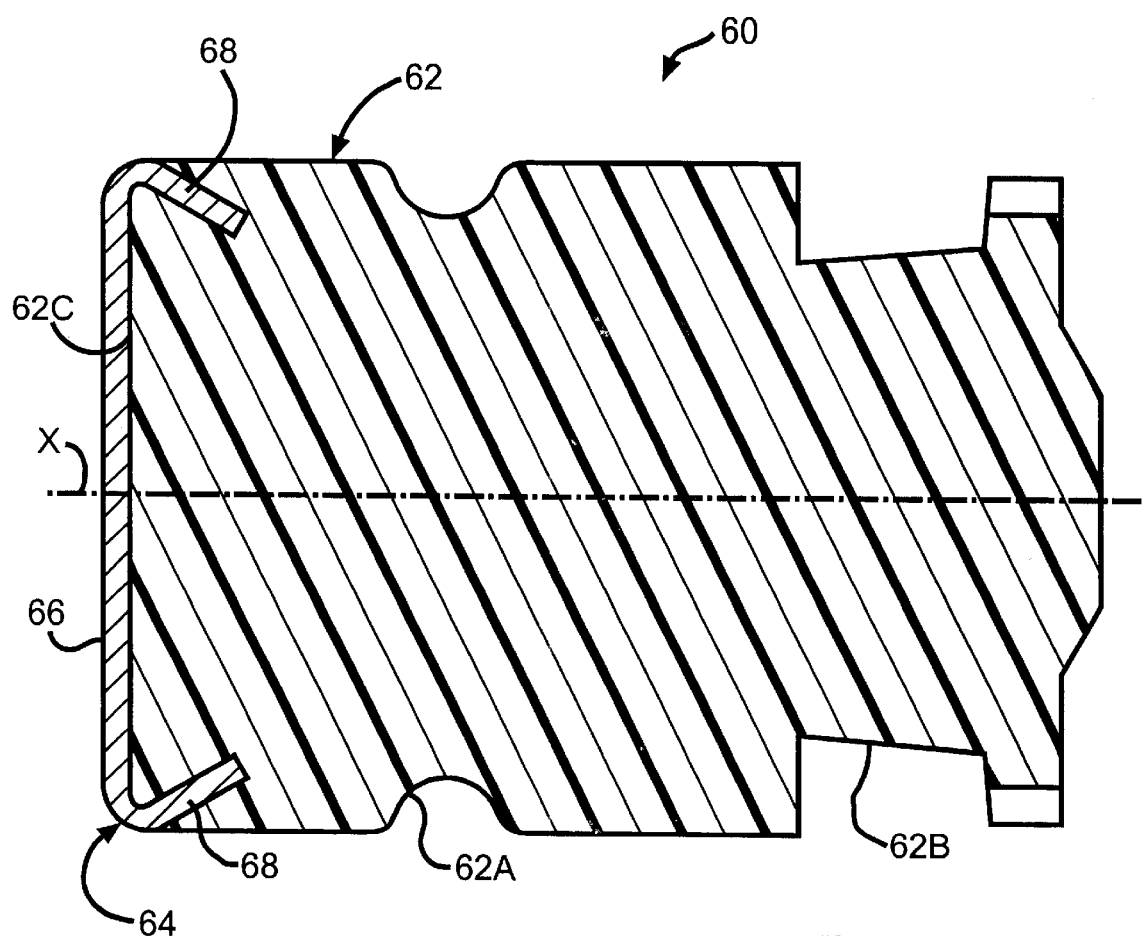
FIG. 2 is a sectional view of a first embodiment of a piston assembly constructed in accordance with this invention and adapted for use in the prior art drum brake assembly illustrated in FIG. 1.

Referring now to the drawings, there is illustrated in FIG. 2 a first embodiment of a piston assembly, indicated generally at 60, constructed in accordance with the present invention. The piston assembly 60 is adapted to be used in a wheel cylinder of a drum brake assembly, such as that shown in prior art FIG. 1. The general structure and operation of the prior art drum brake assembly, indicated generally at 10 in FIG. 1, is conventional in the art. Thus, only those portions of the prior art drum brake assembly 10 which are necessary for a full understanding of this invention will be explained and illustrated in detail. Although this invention will be described and illustrated in connection with the particular vehicle prior art drum brake assembly disclosed in FIG. 1, it will be appreciated that this invention may be used in connection with other drum brake assemblies.

The illustrated prior art drum brake assembly 10 includes a rigid backing plate 11 which is generally flat and circular in shape. The backing plate 11 is adapted to be secured to a fixed, non-rotatable component of the vehicle, such as an outer end of a housing (not shown) for enclosing a rotatable axle. To accomplish this, a relatively large opening 12 is formed through a central portion of the backing plate 11. The central opening 12 is provided to permit the outer end of the rotatable axle to extend therethrough to the driven vehicle wheel (not shown). A plurality of relatively small holes 13 are also formed through the backing plate 11, located about the central opening 12. The small holes 13 are provided to permit threaded bolts (not shown) to extend therethrough to secure the backing plate 11 to the outer end of the axle housing.

An abutment block assembly, indicated generally at 15, is provided on an outer surface of the backing plate 11. The abutment block assembly 15 includes an inner spacer plate 16, which is disposed adjacent to the outer surface of the backing plate 11, and an outer retainer plate 17, which is disposed adjacent to the spacer plate 16. The spacer plate 16 and the retainer plate 17 are secured to the backing plate 11 by a pair of rivets 18 or similar fasteners which extend therethrough to the inner surface of the backing plate 11.

The prior art drum brake assembly 10 further includes first and second brake shoes, indicated generally at 20 and 20'. Structurally, the brake shoes 20 and 20' are essentially mirror images of one another, and like reference numbers are used to indicate similar parts. The brake shoes 20 and 20' include respective web portions 21 and 21' which are generally flat and crescent-shaped. Arcuate table portions 22 and 22' are secured to the opposed outer curved surfaces of the web portions 21 and 21', such as by welding. A friction pad 23 is secured to the outer arcuate surface of the table portion 22 of the brake pad 20, while a friction pad 23' is secured to the outer arcuate surface of the table portion 22' of the brake pad 20'. A circular aperture 24 is formed through the upper end of the web portion 21 of the brake shoe 20 and through the upper end of the web portion 21' of the brake shoe 20'.

The first and second brake shoes 20 and 20' are supported on the backing plate 11 by respective pivot pin and spring-clip assemblies, indicated generally at 25 and 25', which are conventional in the art. As shown by the dotted lines in FIG. 1, the lower ends of the web portions 21 and 21' of the brake shoes 20 and 20', respectively, are slightly curved. The curved lower ends of the web portions 21 and 21' are received between the backing plate 11 and the retainer plate 17 and extend into abutment with the opposed side surfaces of the spacer plate 16. A first coiled spring 26 has hooked ends which extend through respective openings 27 formed through the lower ends of the web portions 21 and 21' so as to urge such lower ends thereof into abutment with the opposed side surfaces of the spacer plate 16.

The prior art drum brake assembly 10 includes a service brake mechanism for actuating the drum brake assembly 10 under normal operating conditions. The service brake mechanism includes a hydraulically actuated wheel cylinder 30 which is disposed between the upper ends of the web portions 21 and 21' of the brake shoes 20 and 20', respectively. The wheel cylinder 30 includes a mounting plate 31 having a pair of threaded openings 31A formed therein. A pair of bolts (not shown) extend through a pair of openings (not shown) provided in the backing plate 11 and threaded ends thereof are received in the threaded openings of the mounting plate 31 to secure the wheel cylinder 30 to the backing plate 11.

The wheel cylinder 30 includes a pair of opposed piston assemblies 32A and 32B which respectively abut the upper ends of the web portions 21 and 21' of the brake shoes 20 and 20'. A second coiled spring 33 has hooked ends which extend through respective openings 28 formed through the upper ends of the web portions 21 and 21' of the brake shoes 20 and 20', respectively, so as to urge such upper ends thereof into abutment with the piston assemblies 32A and 32B. The wheel cylinder 30 is connected to a conventional source of pressurized hydraulic or pneumatic fluid (not shown) for operating the prior art drum brake assembly under normal operating conditions.

The prior art drum brake assembly 10 further includes a hollow cylindrical brake drum 40 which is secured to a wheel (not shown) of the vehicle for rotation therewith. The interior of the brake drum 40 defines a cylindrical braking surface 41. When installed, the brake drum 40 is disposed adjacent to the backing plate 11 such that the brake shoes 20 and 20' extend within the cylindrical braking surface 41. To effect braking action, the brake shoes 20 and 20' are moved outwardly apart from one another so as to frictionally engage the cylindrical braking surface 41 of the brake drum 40. Such frictional engagement causes slowing or stopping of the rotational movement of the brake drum 40 and, therefore, the wheel of the vehicle in a controlled manner.

The hydraulically actuated wheel cylinder 30 is used to operate the drum brake assembly 10 under normal service conditions. When it is desired to actuate the drum brake assembly 10, pressurized hydraulic or pneumatic fluid is supplied to the wheel cylinder 30. Typically, this is accomplished by the operator of the vehicle depressing the brake pedal in the driver compartment of the vehicle. When such pressurized hydraulic or pneumatic fluid is supplied to the wheel cylinder 30, the piston assemblies 32A and 32B are moved apart from one another. As a result, the upper ends of the brake shoes 20 and 20' are also moved apart from one another, essentially pivoting about the abutment block assembly 15. This movement causes the friction pads 23 and 23' of the brake shoes 20 and 20', respectively, to move into frictional engagement with the cylindrical braking surface 41 of the brake drum 40. The abutment block assembly 15 functions to transfer the braking torque from the leading brake shoe (i.e., the left brake shoe 20 when the brake drum 40 is rotating in a counter-clockwise direction) to the frame of the vehicle. When the brake shoes 20 and 20' are moved apart from one another, the second coiled spring 33 is expanded. Thus, when the pressurized hydraulic or pneumatic fluid to the hydraulic actuator 30 is subsequently released, the second coiled spring 33 retracts the brake shoes 20 and 20' inwardly toward one another and out of frictional engagement with the cylindrical braking surface 41 of the brake drum 40.

The prior art drum brake assembly 10 also includes an automatic adjusting mechanism to compensate for thinning of the friction pads 23 and 23' of the brake shoes 20 and 20', respectively, resulting from wear caused by repeated use. The illustrated automatic adjusting mechanism is conventional in the art and includes a pair of struts 42 and 43 having opposed slotted ends. The upper ends of the web portions 21 and 21 ' of the brake shoes 20 and 20', respectively, are received within the slotted ends of the struts 42 and 43. A star wheel portion 42A is threaded onto the strut 42. An adjuster lever 44 is pivotally mounted on the web portion 21 of the brake shoe 20. The adjuster lever 44 has a protruding arm portion 44a which extends into cooperation with the star wheel portion 42a of the strut 42. A third coiled spring 45 has hooked ends which extend through respective openings formed through the adjuster lever 44 and the lower end of the web portion 21 so as to urge the protruding arm portion 44a of the adjuster lever 44 into engagement with the star wheel portion 42a of the strut 42.

As is known, when the brake shoes 20 and 20' are moved outwardly apart from one another such that the friction pads 23 and 23', respectively, frictionally engage the cylindrical braking surface 41 of the brake drum 40, the adjusting lever 44 is pivoted. When a sufficient amount of wear has occurred on the friction pads 23 and 23', the adjusting lever 44 will be pivoted a sufficient amount so as to rotate the star wheel portion 42A relative to the struts 42 and 43. Such relative rotation causes the opposed ends of the struts 42 and 43 to be moved slightly farther apart from one another, together with the associated upper ends of the brake shoes 20 and 20'. Thus, the automatic adjusting mechanism functions to maintain a predetermined clearance between the friction pads 23 and 23' of the brake shoes 20 and 20', respectively, and the cylindrical braking surface 41 of the brake drum 40 as wear occurs during operation of the prior art drum brake assembly 10.

In addition to the service brake mechanism described above, the prior art drum brake assembly 10 further includes a mechanically actuated parking and emergency brake mechanism. The parking and emergency brake mechanism includes an actuating lever, indicated generally at 50. The actuating lever 50 is pivotally supported on the web 21' of brake shoe 20' by a pivot pin assembly which includes a pivot pin 51 having an enlarged head and a reduced diameter body. The body of the pivot pin 51 is inserted through respective aligned apertures formed through the actuating lever 50 and the web portion 21' of the brake shoe 20'. An E-clip 52 is installed in a groove formed about the end of the body of the pivot pin 51 to retain it in the apertures such that the actuating lever 50 is pivotally supported on the brake shoe 20'.

The actuating lever 50 further includes an upstanding pin 53, and a hooked lower end portion 54. The hooked end portion 54 facilitates the connection of one end of an actuating cable 55 thereto. The actuating cable 55 is conventional in the art and is connected to a hand operated lever (not shown) or similar manually operable parking and emergency brake mechanism for selectively actuating the drum brake assembly 10. The construction of the prior art drum brake assembly 10 thus far described is conventional in the art.

Turning now to FIG. 2, the structure of a first embodiment of a piston assembly, indicated generally at 60, in accordance with this invention will be discussed. As shown therein, the piston assembly 60 includes a piston body 62 which defines an axis X and is formed from a first material, and a piston cover 64 formed from a second material. Preferably, the piston body 62 is molded from a plastic and more preferably, the piston body 62 is molded from a synthetic resin material, such as a phenolic resin. However, the piston body 62 can be formed from other materials, such as for example, ceramic. Preferably, the piston cover 64 is formed from a metal, such as for example, steel or aluminum, and is integrally molded in situ with the piston body 62. The cover 64 is preferably formed from stainless steel or carbon steel, and may be electroplated with zinc for corrosion protection. However, the cover 64 can be formed from other materials which are different from the material of the piston body 62, such as for example, aluminum.

In the illustrated embodiment, the piston body 62 is provided with a first annular groove 62A and a second annular groove 62B. The first annular groove 62A is adapted to receive an elastomeric boot seal (not shown), and the second annular groove 62B is adapted to an elastomeric annular fluid seal (not shown).

The piston cover 64 includes an end wall 66 which defines an annular abutment surface and which is adapted to engage the associated upper ends of the brake shoes 20 and 20' as discussed above. In the illustrated embodiment, the end wall 66 of the piston cover 64 fully covers an end wall 62C of the piston body 62. Alternatively, the end wall 66 of the piston cover 64 can cover less then the entire area of the end wall 62C of the piston body 62 if desired. However, it is preferred that the end wall 66 of the piston cover 64 cover at least that portion of the end wall 62C of the piston body 62 which engages the upper ends of the web portions 21 and 21' of the respective brake shoes 20 and 20'.

Figure 3:
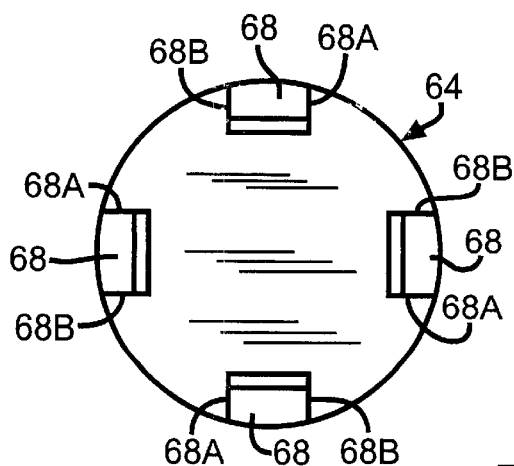
FIG. 3 is a plan view of the end of the cover provided on the piston assembly illustrated in FIG. 2.

The piston cover 64 further includes a plurality of angled "tangs" 68 formed thereon. As used herein, a tang is defined as a projection having a portion which extends from the end wall 66 thereof. Each tang 68 defines a first side edge 68A and a second side edge 68B, shown in FIG. 3. In the illustrated embodiment, four equidistantly spaced angled tangs 68 which extend radially inwardly and axially inwardly are provided on the piston cover 64. However, the number and/or the spacing of the tangs 68 may be varied as desired. In addition, the configuration of the tangs 68 can be other than illustrated. For example, the tangs 68 could be curved, stepped, or L-shaped.

Preferably, the tangs 68 are angled in the range of about 30 degrees to about 60 degrees relative to the axis X, with approximately 45 degrees being the preferred angle. However, the tangs 68 can be angled in the range of 5 to 85 degrees. When the plastic body 62 of the piston assembly 60 is molded about the cover 64, the tangs 68 are embedded therein as best shown in FIG. 2. Thus, the tangs 68 assist in mechanically securing the cover 64 to the piston assembly 60 when the piston body 62 thereof is molded thereabout.

Figure 4:
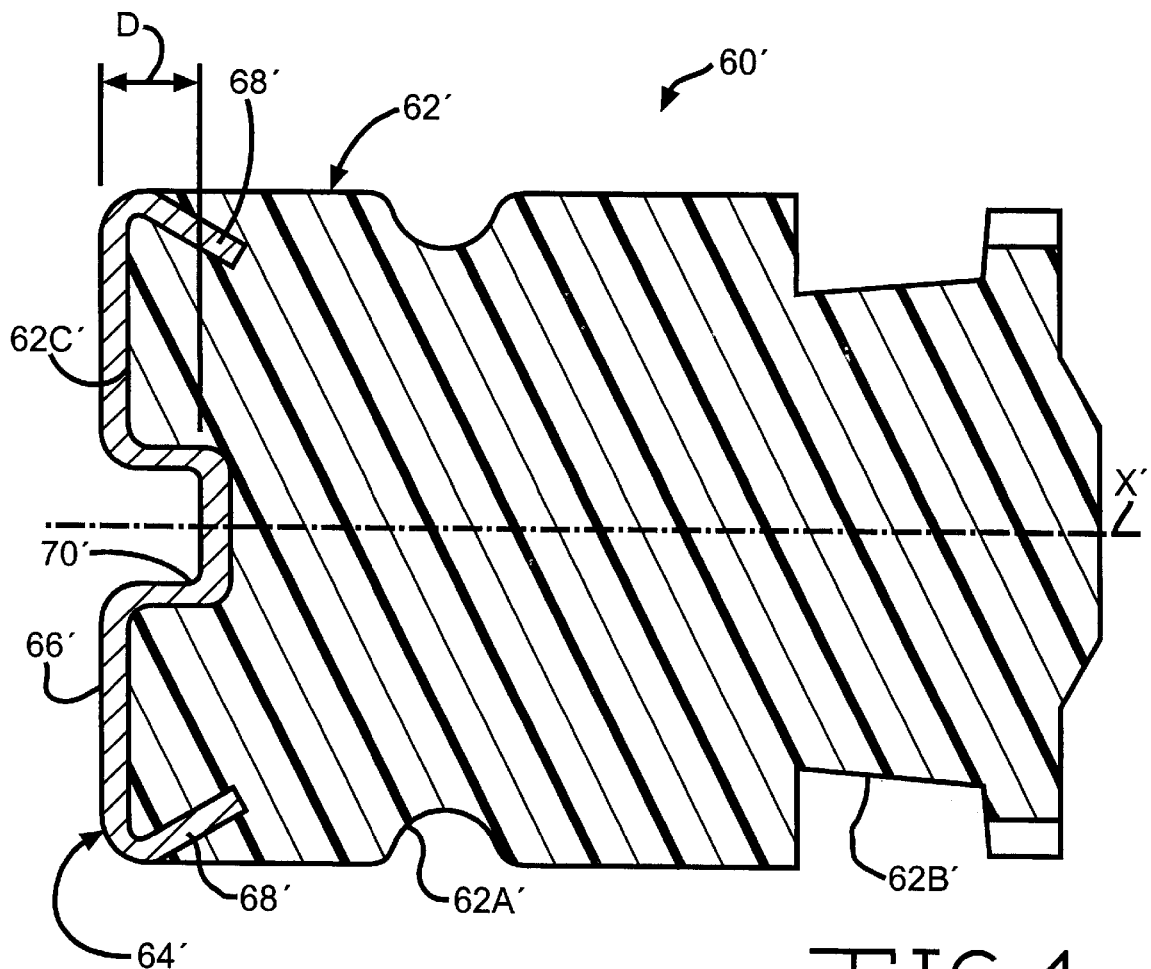
FIG. 4 is a sectional view of a second embodiment of a piston assembly constructed in accordance with this invention.

Turning now to FIG. 4, the structure of the second embodiment of a piston assembly 60' in accordance with this invention will be discussed. As shown therein, the piston assembly 60' includes a piston body 62' which defines an axis X' and is formed from a first material, and a piston cover 64' formed from a second material. Preferably, the piston body 62' is molded from a plastic and more preferably, the piston body 62' is molded from a synthetic resin material, such as a phenolic resin. However, the piston body 62' can be formed from other materials, such as for example, ceramic. Preferably, the piston cover 64' is formed from a metal, such as for example, steel or aluminum, and is integrally molded in situ with the piston body 62'. The cover 64' is preferably formed from stainless steel or carbon steel, and may be electroplated with zinc for corrosion protection. However, the cover 64' can be formed from other materials which are different from the material of the piston body 62', such as for example, aluminum.

The piston body 62' is provided with a first annular groove 62A' and a second annular groove 62B'. The first annular groove 62A' is adapted to receive an elastomeric boot seal (not shown), and the second annular groove 62B' is adapted to an elastomeric annular fluid seal (not shown).

In the illustrated embodiment, the piston cover 64' includes an end wall 66' having a slot or recess 70' provided therein, which defines an annular abutment surface and which is adapted to receive the associated upper ends of the brake shoes 20 and 20'. To accomplish this, the recess 70' defines a width W which is slightly greater than the thickness of the web portions 21 and 21' of the respective brake shoes 20 and 20'. The recess 70' extends inwardly from the end wall 66' a predetermined axial distance D. In the illustrated embodiment, the recess 70' extends across the entire face of the end wall 66' of the cover 64'. Alternatively, the location, configuration, and/or design of the recess 70' can be other than illustrated if desired.

Figure 5:
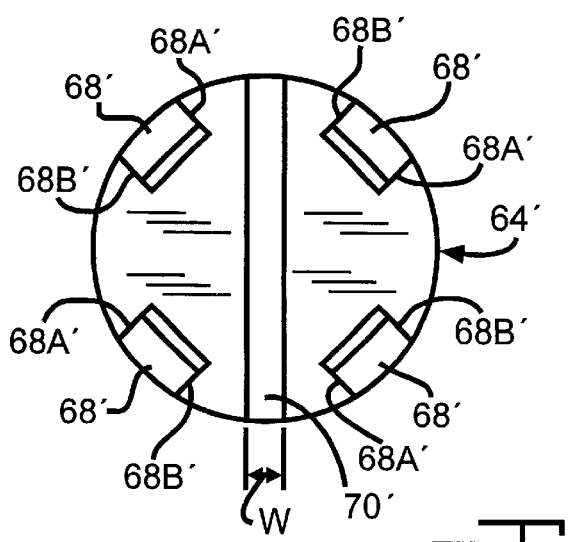
FIG. 5 is a plan view of the end of the cover provided on the piston assembly illustrated in FIG. 4.

In the illustrated embodiment, the piston cover 64' further includes a plurality of angled tangs 68' formed thereon. Each tang 68' defines a first side edge 68A' and a second side edge 68B', shown in FIG. 5. In the illustrated embodiment, four equidistantly spaced angled tangs 68' which extend radially inwardly and axially inwardly are provided on the piston cover 64'. However, the number and/or the spacing of the tangs 68' may be varied as desired. In addition, the configuration of the tangs 68' can be other than illustrated. For example, the tangs 68' could be curved, stepped, or L-shaped.

Preferably, the tangs 68' are angled in the range of about 30 degrees to about 60 degrees relative to the axis X', with approximately 45 degrees being the preferred angle. However, the tangs 68' can be angled in the range of 5 to 85 degrees. When the plastic body 62' of the piston assembly 60' is molded about the cover 64', the tangs 68' are embedded therein as best shown in FIG. 2. Thus, the tangs 68' assist in mechanically securing the cover 64' to the piston assembly 60' when the piston body 62' thereof is molded thereabout.

In the illustrated embodiment, the end wall 66' of the piston cover 64' fully covers the end wall 62C' of the piston body 62'. Alternatively, the end wall 66' of the piston cover 64' can cover less then the entire area of the end wall 62C' of the piston body 62' if desired. However, it is preferred that the end wall 66 of the piston cover 64' cover at least that portion of the end wall 62C' of the piston body 62' which engages the upper ends of the web portions 21 and 21' of the respective brake shoes 20 and 20'.

Although this invention has been described and illustrated in connection with a particular prior art drum brake assembly 10 illustrated in FIG. 1, it will be appreciated that this invention may be used in connection with other drum brake assemblies. For example, this invention may be used in a "duo-servo" type of drum brake assembly, or in a "dual mode" drum brake assembly, wherein the service brake is of the leading/trailing type and the parking and emergency brake is of the duo-servo type. Some examples of the above brake assemblies are shown in U.S. Pat. No. 5,070,968 to Evans, and U.S. Pat. No. 5,275,260 to Evans et al., the disclosures of which are incorporated herein.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A piston assembly adapted for use in a wheel cylinder of a drum brake assembly, the drum brake assembly having a pair of brake shoes which are adapted to be urged into frictional engagement with a brake drum, the piston assembly comprising:

a piston body formed from a plastic material, said piston body including a piston body end wall disposed adjacent at least one of the pair of brake shoes, said piston body end wall terminating at an outer face, said outer face including a generally annular outer surface which defines a maximum outer diameter of said piston body;

a generally flat piston cover formed from a metal material and integrally molded in situ with said piston body, said piston cover including a piston cover end wall, said piston cover end wall including an outer cover surface which defines a maximum outer diameter of said piston cover, said piston cover end wall extending across and completely covering the entire said outer face of said piston body end wall and defining a fall face abutment surface adapted to be disposed between an upper end of the brake shoe and the piston body end wall, said abutment surface engaging the upper end of the brake shoe during brake actuation, said outer diameter of said piston body and said outer diameter of said piston cover being generally the same; and a plurality of circumferentially spaced projections extending radially inwardly from said piston cover end wall into said piston body and integrally molded and embedded within said piston body, each of said projections defining first and second side edges which are in contact with said piston body to thereby assist in securing said piston cover to said piston body.

2. The piston assembly defined in claim 1 wherein said projections extend radially inwardly at an angle in the range of from 30° to 60°.

3. The piston assembly defined in claim 1 wherein said piston cover end wall is provided with a recess formed therein, said recess adapted to receive an associated end of one of the pair of brake shoes.

4. The piston assembly defined in claim 3 wherein said recess extends across the entire said outer face of said piston cover end wall.

5. The piston assembly defined in claim 1 wherein said plastic material is a synthetic resin material and said metal material is stainless steel.

6. A drum brake assembly including the piston assembly defined in claim 1.

* * * * *